(12) United States Patent
Soliman et al.

(10) Patent No.: US 8,163,378 B2
(45) Date of Patent: Apr. 24, 2012

(54) SCRATCH-RESISTANT MOULDED ARTICLE MADE FROM A FILLED POLYPROPYLENE COMPOSITION

(75) Inventors: Maria Soliman, Schalbruch (DE); Franciscus Elisabeth Jacobus Essers, Maastricht (NL); Peter Degenhart, Echt (NL)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 12/995,854

(22) PCT Filed: May 12, 2009

(86) PCT No.: PCT/EP2009/003368
§ 371 (c)(1),
(2), (4) Date: Jan. 10, 2011

(87) PCT Pub. No.: WO2009/138211
PCT Pub. Date: Nov. 19, 2009

(65) Prior Publication Data
US 2011/0097577 A1    Apr. 28, 2011

(30) Foreign Application Priority Data
May 15, 2008  (EP) .................................. 08008991

(51) Int. Cl.
*B32B 27/04* (2006.01)
(52) U.S. Cl. .................... 428/297.4; 524/230; 524/232; 524/528
(58) Field of Classification Search ........... 428/297.4; 524/230, 232, 528; 525/296
See application file for complete search history.

(56) References Cited

U.S. PATENT DOCUMENTS

| | | | | |
|---|---|---|---|---|
| 5,972,503 | A * | 10/1999 | Woodside | 428/378 |
| 5,998,029 | A * | 12/1999 | Adzima et al. | 428/392 |
| 6,869,993 | B2 | 3/2005 | Watanabe et al. | |
| 6,964,997 | B2 | 11/2005 | Kikuchi et al. | |
| 7,888,432 | B2 * | 2/2011 | Voorheis | 525/261 |
| 2002/0077396 | A1 | 6/2002 | Yu et al. | |
| 2006/0009554 | A1 * | 1/2006 | Sharma | 524/230 |
| 2006/0058434 | A1 | 3/2006 | Watanabe | |
| 2006/0189744 | A1 * | 8/2006 | Tse et al. | 524/447 |
| 2006/0276571 | A1 * | 12/2006 | Sharma et al. | 524/98 |
| 2007/0066726 | A1 * | 3/2007 | Sharma et al. | 524/115 |
| 2009/0105402 | A1 * | 4/2009 | Neuteboom et al. | 524/528 |
| 2010/0210780 | A1 * | 8/2010 | Sugimoto | 524/451 |
| 2010/0317779 | A1 * | 12/2010 | Pham et al. | 524/141 |
| 2011/0097577 | A1 * | 4/2011 | Soliman et al. | 428/339 |

FOREIGN PATENT DOCUMENTS

| | | | |
|---|---|---|---|
| JP | 58183230 | A | 10/1983 |
| JP | 6220270 | A | 8/1994 |
| WO | 9806551 | | 2/1998 |
| WO | 9900543 | A1 | 1/1999 |
| WO | 02051934 | A1 | 7/2002 |
| WO | 2004099303 | A1 | 11/2004 |
| WO | 2006003127 | A1 | 1/2006 |
| WO | WO 2006/063698 | A1 | 6/2006 |
| WO | 2006131455 | A1 | 12/2006 |

OTHER PUBLICATIONS

Japanese Patent No. 6220270 (A); Publication date Aug. 9, 1994; Abstract only; 1 page.
International Search Report; International Application No. PCT/EP2009/003368; International Filing Date May 12, 2009; 3 pages.
Written Opinion of the International Searching Authority; International Application No. PCT/EP2009/003368; International Filing Date May 12, 2009; 5 pages.

* cited by examiner

*Primary Examiner* — N. Edwards
(74) *Attorney, Agent, or Firm* — Cantor Colburn LLP

(57) ABSTRACT

The invention relates to a moulded article made from a polypropylene composition comprising 48-94.9 mass % of a polypropylene; 5-30 mass % of glass fibers having average length of 1-50 mm; 0.1-2 mass % of oleamide and/or erucamide; and 0-20 mass % of other additives; the article showing a color change of dL<2 in the PSA/Renault scratch tests and a color change of dL<1.5 in the Erichsen scratch test.

This article shows an excellent combination of properties, especially a good balance between stiffness and impact resistance, which have excellent surface appearance, and high resistance to surface scratching and abrasion.

14 Claims, No Drawings

SCRATCH-RESISTANT MOULDED ARTICLE MADE FROM A FILLED POLYPROPYLENE COMPOSITION

The invention relates to a moulded article made from a filled polypropylene composition, and to use of such article in e.g. automotive interior applications. More specifically, the invention relates to a moulded article made from a polypropylene composition comprising a filler, which article has a desirable combination of properties, that is an excellent balance between stiffness (or rigidity) and impact resistance (or toughness), good dimensional stability, and attractive surface characteristics, especially good scratch resistance.

Such a moulded article made from a polypropylene composition is for example known from publication U.S. Pat. No. 6,869,993 B2. This document discloses a moulded article made of a polypropylene composition comprising 5-25 mass % of inorganic filler particles and 0.1-1 mass % of a fatty acid amide, wherein the polypropylene matrix comprises a mixture of a polypropylene impact copolymer, a copolymer of ethylene and a C3-C20 alpha-olefin having a density of 0.85-0.885 g/cm$^3$, and optionally a propylene homopolymer. It is indicated that the filler is preferably talc, having average particle diameter of below 5 μm (micrometer).

Polypropylene compositions, and especially filled propylene copolymers, find wide application in automotive components and housings or covers for electrical or household appliances, because of their easy processability, low density and favourable cost/performance balance. Standard propylene homopolymer has several deficiencies that prohibit its use in applications that require stiffness, toughness, like automotive parts. Impact performance can be dramatically improved by blending polypropylene with rubbery materials like ethylene-alpha olefin copolymers; during (multi-step) copolymerisation reactions or by separately mixing the components. Such polypropylene compositions are often referred to as propylene (high) impact copolymers. By adding suitable inorganic fillers or reinforcing materials to impact copolymers, stiffness of moulded articles made of such polypropylene compositions can be increased, be it that impact properties tend to decrease. A desirable balance between stiffness and impact resistance of such moulded article may be obtained by optimizing the composition of the propylene copolymer, and amount and type of filler.

For application in parts that have high aesthetic requirements, like good surface appearance and resistance to scratching, further recipe optimisations of polypropylene compositions are generally needed. Many documents address improving scratch resistance of moulded articles made of polypropylene compositions by incorporation of certain additives. For example, JP 6220270 discloses that addition of 0.05-3 mass % of higher fatty acid amide or its derivatives to a composition comprising a crystalline propylene homopolymer and/or propylene-ethylene copolymer, and elastomeric ethylene-butene copolymer improves scratch resistance of the obtained moulded article.

In US 2002/077396 addition of 0.1-3 mass % of a fatty acid or a fatty acid amide is indicated to improve flowability and scratch-resistance of a polypropylene composition. The composition may further contain 0.1-3 mass % of inorganic filler as nucleating agent; a higher content is indicated to result in moulded articles with too low mechanical properties.

WO 2006/003127 A1 discloses a moulded article made of polyolefin compositions with improved scratch resistance, which contain an additive combination of a fatty acid amide and a maleated polyolefin functionalized with a long chain alcohol or amine. WO 2006/131455 A1 discloses moulded articles with improved scratch resistance and good heat and light stability made of polyolefin compositions that contain an additive combination of i) a fatty acid amide, ii) a carboxylic acid reagent functionalized polyolefin, and iii) a mixture of low and high molar mass hindered amine light stabilisers (HALS). It is mentioned that such composition may further comprise a filler or reinforcing agent.

In US 2006/0058434 A1 a polypropylene composition comprising inorganic filler particles preferably smaller than 5 μm and a fatty acid amide is disclosed, wherein the polypropylene matrix composition is optimized to result in a moulded article having desired combination of stiffness, toughness and scratch resistance.

U.S. Pat. No. 6,964,997 discloses a moulded article for interior parts of a car, made from a polypropylene composition comprising a mixture of certain propylene polymers and copolymers of specified composition and melt flow properties, 0.01-2 mass % of a fatty acid amide or derivative thereof, and 10-30 mass % of inorganic fillers of particle size 0.1-0.4 μm.

In EP 1362080 a moulded article made of a polypropylene composition containing inorganic filler, preferably talc or calcium carbonate, and a silicone-grafted polyethylene is described, which article shows improved mould release and scratch-resistance.

EP 1620501 discloses that scratch resistance of a moulded article made from a polypropylene composition comprising polypropylene, ethylene-alpha-olefin copolymer, maleic anhydride-grafted polypropylene, 2-25 mass % of talc and 0.2-0.5 mass % of unsaturated fatty acid amide can be further enhanced by incorporating 0.2-0.5 mass % of a mixture of ethylene-vinyl acetate copolymer and aliphatic petroleum resin.

WO 2006/063698 A1 discloses a polypropylene composition comprising a polypropylene; 2-20 mass % of a branched low density polyethylene with a density between 910 and 935 kg/m$^3$; 1-20 mass % of a copolymer of ethylene and a C3-C20 α-olefin with a density between 840 and 890 kg/m$^3$; and 0.5-60 mass % of a filler. The addition of the ethylene (co) polymers is indicated to improve scratch-resistance of the obtained moulded articles without the need for an additive like fatty acid amide.

Scratch and/or mar resistance are important characteristics of articles made from polymeric materials for many applications, and are widely used as a key critical performance property, especially in automotive industry for evaluating the durability of plastic products as exterior and interior parts. Various instruments and test methods have been developed to quantify and rank scratch resistance with respect to the imposed scratch conditions. Many researchers have tried to relate mechanical properties, such as tensile strength, to scratch resistance, or to correlate scratch resistance to toughness through the analysis of fracture energy. Such correlations between scratch resistance and other material properties, however, remain illusive. As a result, current scratch test results and qualifications are highly dependent on the test or system used, and the test conditions applied. In addition, each automotive company appears to apply a different test method and specification related to scratch and/or mar, such that a plurality of tests has to be performed for a polymeric system that is to be supplied for automotive applications for which good appearance is a key attribute.

In general, two different types of scratch resistance tests can be recognized. A first type of testing typically includes contacting the surface with abrasive slurries, or with abrasive powders or paper. It is sometimes held that such a test characterizes mar resistance rather than scratch resistance. in a second type of testing single-probe devices, with a well-defined tip or needle, are applied to make a limited number of surface cuts. Scratch resistance is typically measured by assessing surface appearance changes brought about by the friction- or probe-induced damage. Scratch resistance assessment is generally based on relative and qualitative types of measurements that aim to identify the optical contrast between the damaged area and its surroundings, such as by visual inspection, gloss changes, and changes in gray scale level or lightness. An ideal polymeric material would show good resistance to both types of induced damage.

A drawback of the known moulded articles made from talc-filled polypropylene compositions as disclosed in document U.S. Pat. No. 6,869,993 B2 is that they do not fulfill typical requirements for mechanical properties in combination with scratch resistance as measured with both abrasion and single-probe types of tests. There is thus a need in industry for moulded articles made from polypropylene compositions that combine certain tensile and impact properties, with good surface appearance and improved resistance to scratching and abrasion.

The object of the invention is therefore to provide a moulded article with an improved combination of properties.

This object is achieved according to the invention with a moulded article made from a polypropylene composition comprising
(A) 48-94.9 mass % of a polypropylene;
(B) 5-30 mass % of glass fibres having average length of 1-50 mm;
(C) 0.1-2 mass % of a fatty acid amide that is oleamide and/or erucamide; and
(D) 0-20 mass % of other additives,
the article showing a colour change of dL<2 in the PSA/Renault D44 1900 EN1-RNPO 2001 scratch test and a colour change of dL<1.5 in the Volkswagen PV 3952 2002 scratch test. The sum of all components A to D is 100%.

The moulded article according to present invention shows an excellent combination of properties, especially a good balance between stiffness and impact resistance, which have excellent surface appearance, and high resistance to surface scratching and abrasion.

It is surprising that the moulded article according to the invention made of a polypropylene composition comprising glass fibres of certain length shows such well-balanced combination of properties including improved scratch-resistance, because prior art documents relating to improving scratch resistance of moulded articles made from filled polypropylene compositions generally teach that inorganic fillers of certain maximum particle size in the micrometer range or even below should be used.

Furthermore, the moulded article according to the invention made from said polypropylene composition shows relatively low and isotropic shrinkage behaviour and little warpage, compared to articles made from a composition with e.g. fibrous fillers of lower length. A further advantage is a relatively high heat distortion temperature, enabling the use of said moulded article over a wide temperature range.

The moulded article according to present invention shows a colour change of dL<2 in the PSA/Renault scratch test measured according to D44 1900 EN1-RNPO 2001. Preferably, the article shows a colour change of dL<0.85 when measured with this test.

The moulded article according to present invention also shows a colour change of dL<1 in the in the Volkswagen (VW) scratch test measured according to PV 3952 2002 at a load of 10N. Preferably, the article shows a colour change of dL<1.1 when measured with this test.

Preferably, the moulded article according to the invention further shows in the Ford test measured according to BN108-13 2001 that the scratch measured at a force of 2N is not visible and the scratch measured at a force of 3N is not visible for more than 30% of the scratch length.

More preferably, the moulded article according to the invention further shows a CLTE (coefficient of linear thermal expansion) lower than 50 μm/mk and/or a shrinkage value lower than 0.80%.

The polypropylene composition in the moulded article comprises as component (A) at least one crystallisable polypropylene polymer, which can be a propylene homopolymer, a random copolymer of propylene and another olefin like ethylene, a propylene impact copolymer, a modified- or functionalized- propylene homopolymer or copolymer, or mixtures thereof. The polypropylene being crystallisable generally means that the polymer has an isotactic structure, i.e. its isotacticity is high, for instance higher than 95% and preferably higher than 98%. A random copolymer generally contains at most about 20 mol % of other olefins as comonomer, preferably at most 10 mol %, to retain crystalline character. The at least one other olefin may be for instance an α-olefin, in particular a 1-alkene having for instance 2 or 4-20 C-atoms or cyclic olefins, optionally containing more than one ring, having a double bond in the ring structure. Examples of suitable olefins include ethylene, butene, hexene, styrene, cyclopentene and/or norbornadiene. Preferably, the α-olefin is a 1-alkene having 2 or 4-8 C-atoms, more preferably, the α-olefin is ethylene.

Preferably, the polypropylene polymer in the moulded article according to the invention is a propylene impact copolymer, because this results in a favourable combination of stiffness and toughness. Propylene impact copolymers are also referred to as propylene block-copolymers or as heterophasic polypropylene copolymers. Such material basically has at least a two-phase structure, consisting of a crystalline propylene-based matrix and a dispersed elastomeric phase, typically an ethylene-olefin copolymer like an ethylene-propylene rubber (EPR). These polypropylenes are generally prepared in one or more reactors, by polymerization of propylene in the presence of a catalyst, and subsequent polymerization of a propylene-ethylene mixture, but may also be prepared by blending individual components; as is well known to a skilled person. The resulting polymeric materials are heterophasic, but their specific morphology usually depends on the preparation method and monomer types and ratios.

Generally, the impact copolymer contains about 50-95 mass % of a crystalline propylene homo- or random-copolymer matrix, and about 50-5 mass % of dispersed copolymer of ethylene and at least one other olefin.

The amount of dispersed phase is preferably 10-35 mass %, more preferably 15-30 or 17-25 mass % of the total amount of heterophasic polymer, to arrive at a desired stiffness-impact balance in the composition according to the invention. The dispersed phase comprises a copolymer of ethylene and at least one other olefin, preferably a $C_3$ to $C_{10}$ alpha-olefin. Examples of suitable $C_3$ to $C_{10}$ alpha-olefins include 1-butene, 1-pentene, 4-methyl-1-pentene, 1-hexene, 1-heptene and 1-octene. Preferably, an ethylene-propylene copolymer, known also as ethylene-propylene rubber (EPR) is used as dispersed phase. The ethylene content of said copolymer may vary widely, generally from 10-80 mass %. Preferably, the ethylene content is about 50-75 mass %, more preferably 55-70 mass %.

The polypropylene composition in the moulded article may also contain a modified polypropylene; this generally improves properties by affecting glass fibres—polypropylene interactions. Examples of suitable modified polypropylenes are polypropylenes grafted with for instance an unsaturated organic compound, like a carboxylic acid, an anhydride, an ester, or salts thereof. Suitable examples include maleic, fumaric, (meth)acrylic, itaconic or cinnamic acid or anhydride, ester or salt thereof. Preferably maleic anhydride is used. The amount of modified polypropylene may vary widely, but for economical reasons the amount normally will be rather low, for instance less than 5 mass %, preferably less than 4, 3, 2 or even 1 mass % (based on total composition).

The MFI of the polypropylene in the composition (measured in accordance with ISO 1133 using a 2.16 kg weight and at a temperature of 230° C.) may range between wide limits, for instance between 0.1 and 100 g/10 min. Preferably, the MFI is in the range 10-40 g/10 min, to allow easy processing, like injection moulding. The MFI of the polypropylene composition as such is generally not measured, as presence of the long glass fibres seriously hampers such measurement.

The polypropylene composition comprises as component (B) 5-30 mass % of glass fibres having length of 1-50 mm. Preferably, polypropylene composition comprises as component (B), 5-25 mass % and more preferably 5-20 mass % of glass fibres having length of 1-50 mm. A composition containing glass fibres of length greater than 1 mm is generally referred to as a long glass fibre (LGF) reinforced composition, in this case a LGF PP composition. In contrast, short glass fibre compositions or compounds typically contain fibres of length below 1 mm. Such compounds are typically made by mixing chopped strands of pre-determined length with a thermoplastic polymer in an extruder, during which the glass fibres are dispersed in the molten thermoplastic. Because of fibre breakage occurring during this process the fibre length is decreased. Upon moulding the composition into an article, the fibres are further reduced in size.

Long glass fibre-reinforced polymer compositions in the form of, for example, pellets or granules can be prepared from continuous lengths of fibres by a sheathing or wire-coating process, by crosshead extrusion or several pultrusion techniques. Using these technologies, fibre strands impregnated or coated with a polymer are formed; these may then be cut into lengths, and the pellets or granules thus obtained can be further processed, e.g. by injection moulding or extrusion processes, into (semi)-finished articles.

In a pultrusion process, a bundle of continuous glass filaments is spread out into individual filaments and drawn through an impregnation die, into which molten thermoplastic is injected, aiming at entirely wetting and impregnating each filament with the molten thermoplastic. A strand of diameter of about 3 mm is drawn from the die and then cooled. Finally the strand is chopped into segments of the desired length. The glass fibres are generally parallel to one another in the segment, with each fibre being individually surrounded by the thermoplastic.

The process of sheathing or wire-coating is done without wetting fibres individually with thermoplastic, but by forming a continuous outer sheath, also called coating or skin, of a thermoplastic material around the continuous multifilament strand surface. The sheathed continuous strand is chopped into pellets or granules of desired length, e.g. for about 12 mm length, in which the fibres are generally parallel to one another and have the same length as the pellets or granules. The LGF pellets are further supplied to an injection moulding or compression moulding machine, and during this moulding step the glass fibres are dispersed within the thermoplastic polymer and formed into moulded (semi)-finished articles.

Documents EP 0921919 B1 and EP 0994978 B1 describe a typical sheathing or wire-coating method.

The average length of the glass fibres in the composition used to make the article according to the invention is preferably at least 2 mm, to result in higher strength and stiffness, more preferably at least 3, 4, 5 or even 6 mm. Too high a length may cause some problems, for example in processing or in surface appearance of the moulded article, therefore the length of the glass fibres is preferably at most 40 mm, more preferably at most 30, 20 or 15 mm. A composition containing fibres of average length 6-15 mm is found to present an optimum in mechanical properties, shrinkage and scratch-resistance of the moulded article obtained thereof.

The diameter of the glass fibres in the composition according to the invention is not very critical, but very thick fibres may result in a decrease of mechanical properties and/or lower surface quality. Generally, the diameter ranges from 5 to 50 microns, preferably from 8 to 30 microns, more preferably from 10 to 20 microns.

The amount of glass fibres affects mechanical properties, as well as processing and mould shrinkage behaviour, and aesthetic aspects of the moulded article obtained thereof and, depending on the desired properties profile, the amount can be optimised. in many cases, the moulded article will need to have mechanical properties comparable to an article comprising mineral filled compositions, and amount of glass can be relatively low. Preferably, glass fibres content is at least 5, 6, 7, 8 or 9 mass %, and at most 25, 20, 18, 16, 14 or 12 mass %; a well-balanced performance was obtained with about 10 mass % of glass fibres.

The moulded article is made from a polypropylene composition, which comprises as component (C) 0.1-2 mass % of that is oleamide and/or erucamide. Oleamide and erucamide are the amides of fatty acids oleic acid and erucic acid, and have molecular formula $C_{18}H_{35}NO$ and $C_{22}H_{43}NO$, respectively. A certain amount of fatty acid amide decreases the visibility of surface damage like scratches on the moulded article. Preferably, the amount of fatty acid amide is at most 1 mass %, more preferably at most 0.8 or 0.5 mass %. It is a special advantage of the present invention that the amount of fatty acid amide can be kept relatively low, because higher amounts may result in excessive migration of the compound to the surface of the moulded article and cause problems like stickiness etc.

The polypropylene composition may further optionally comprise as component (D) 0-20 mass % of other additives. This includes customary additives like nucleating agents, clarifiers, stabilizers, release agents, plasticizers, anti-oxidants, UV stabilizers like HALS compounds, colorants, flame-retardant additives, lubricants like calcium stearate, mold release agents, flow enhancers and/or anti-static agents. The skilled person will know how select the type and amount of additives when needed, and to apply them in such amount that they do not detrimentally influence the aimed properties of the composition. In order to further enhance especially scratch resistance, also anti-scratch additives like silicones, or LDPE, specifically long chain branched LDPE may be added, as is know from other publications.

The composition according to the invention can be made with known processes, for example by mixing all components on an extruder, to obtain the composition of pellet or granule form. The composition can also be made by blending different pellets of different compositions. Preferably, the composition is a mixture of pellets of different compositions, and contains a masterbatch (or concentrate) of glass fibres; that is a composition based on a polypropylene polymer and 30-75 mass % of long glass fibres. The polypropylene in this masterbatch is as above described for the composition according to the invention, and may be the same as or different from the polypropylene in other pellets. The advantage hereof is that the LGF PP compound can be made in an efficient way, and the total amount of glass fibres in the final composition and moulded article can be easily adjusted to optimize performance. Preferably, the masterbatch contains 35-70, 40-65, or 45-60 mass % of glass fibres.

The moulded article according to the invention can be a semi-finished or finished article made from the polypropylene composition by a moulding process. Examples of suitable moulding processes include injection moulding, compression moulding, extrusion and extrusion compression moulding. Injection moulding is most widely used to produce articles such as automotive parts. A semi-finished article may subsequently undergo further known processing steps. The article according to the invention preferably has a so-called textured surface, which further reduces sensitivity to and/or visibility of surface damage like scratches.

Generally, the length of glass fibres in a polymer composition decreases during a melt processing step like injection moulding. The average length of the glass fibres in the moulded article made from the composition according to the invention may vary widely, depending on both starting length and processing conditions. Preferably, the average fibre length in the moulded article is at least 0.5, 0.6, 0.7, 0.8 or 0.9 mm, and most preferably between about 1 and 5 mm.

The invention further relates to the use of a moulded article according to the invention in applications wherein in addition to e.g. good tensile and impact properties also aesthetic aspects are important, such as visible (non-painted) parts for automotive exterior and interior applications, or electrical appliances. Examples of automotive parts include bumper beams, bumper fascia, instrument panel structures, pillars, consoles, interior trim parts, and door panel parts.

The invention will be further elucidated with reference to the following non-limiting experiments.

COMPARATIVE EXPERIMENT A

A mixture of pellets was made containing a LGF PP compound comprising 60 mass % of glass fibres (SABIC® STAMAX 60YM240-00900; pellet length 12.5 mm; made via a wire-coating process), a stabilized propylene impact copolymer containing 25 mass % of ethylene-propylene copolymer having 60 mass % ethylene content (SABIC®PP CX03-82; MFI 10), 0.1 mass % calcium stearate and 2 mass % of a dark grey color masterbatch (LDPE-based, about 50 mass % of colorants); resulting in a glass content of about 10 mass %. The mixture was injection moulded using a standard machine equipped with a three-zone screw typically used for mineral filled PP compounds, at temperature settings of 240° C., into standard test samples. Results are summarized in Table 1. The sample fulfils the requirements of the PSA/Renault test (colour change dL<2; greyscale assessment≧3), but not of the VW scratch resistance test and of the Ford scratch test.

The VW scratch resistance test was measured according to the PV 3952 2002 scratch method of Volkswagen AG company on an Erichsen scratching device, with a load of 10N. The resulting value dL is a measure for the scratch resistance, a low dL value corresponding to high scratch resistance; this means that the scratch does not turn white but keeps the original colour of the scratched plaque. To fulfill this test requirement, dL should be lower than 1.5.

The PSA/Renault scratch resistance was measured according to the D44 1900 EN1-RNPO 2001 scratch method. Sandpaper was used to scratch once over the surface of a textured plaque. The grey scale and the dL were measured. To fulfill this test requirement, dL should be lower than 2 and the greyscale assessment should be higher or equal to 3.

The Ford scratch resistance was measured according to the BN108-13 2001 scratch method (also known as Ford 5 finger scratch test) of Ford Motor Company. During this test, a textured plaque was exposed to scratches of five different pens, each having its own force varying from 2N to 7N. To fulfill the requirements of this test, the 2N scratch should be invisible and the 3N scratch should not be visible for more than 30% of the scratch length.

EXAMPLE 1

Comparative experiment A was repeated, but now the composition further contained 0.2 mass % of oleamide. Again, a good balance of stiffness and impact properties is observed, as well as low shrinkage values (similar in different directions). In addition, this material results also in a positive evaluation in the VW scratch test and Ford scratch test.

COMPARATIVE EXPERIMENTS B AND C

In Table 1 also some data is presented on two commercial, mineral filled polypropylene compositions:
CE B is the material SABIC® PPcompound 7715, containing about 15 mass % of talc;
CE C is the material SABIC® PPcompound 7705, containing about 20 mass % of talc.
Compositions with these small mineral fillers clearly show lower HDT, more shrinkage, and lower scratch-resistance.

COMPARATIVE EXPERIMENT D

Comparative experiment A was repeated, but now the composition further contained 0.2 mass % of ethylene(bis)stearamide (EBS). The moulded article did not meet the requirements of VW and Ford scratch tests.

It can thus be concluded that the article according to the invention shows a better combination of modulus and impact resistance, lower shrinkage, lower CLTE, and better scratch resistance than known parts moulded from polypropylene compositions.

TABLE 1

|  | unit | CE A | Example 1 | CE B | CE C | CE D |
|---|---|---|---|---|---|---|
| Ash content 4 hrs 600° C. | | | | | | |
| Value | mass % | 10.71 | 11.16 | 14.5 | 20.5 | 10.2 |
| MFI [2.16 Kg] | | | | | | |
| Value | g/10 min | 9.5 | | 19.01 | 25 | 9.7 |
| Izod ISO180/4A | | | | | | |
| 23° C. Perpend. | kJ/m$^2$ | 11 | 12 | 9 | 21 | 11 |
| 0° C. Perpend. | kJ/m$^2$ | 7 | 7 | 5 | 6 | 7 |

TABLE 1-continued

|  | unit | CE A | Example 1 | CE B | CE C | CE D |
|---|---|---|---|---|---|---|
| −20° C. Perpend. | kJ/m² | 5 | 5 | 3 | 3 | 6 |
| −30° C. Perpend. | — | 5 | 5 |  |  | 5 |
| Flexural ASTM D790 23° C. |  |  |  |  |  |  |
| E-modulus | N/mm² | 1811 | 1823 | 1861 | 1880 | 1821 |
| Flexural strength | N/mm² | 46 | 45 | 39 | 37 | 45 |
| HDT B ISO 75/B | — |  |  |  |  |  |
| Value: | ° C. | 154.6 | 154.7 | 113.4 |  | 154.5 |
| CLTE ASTM D696 −30 to 80° C. |  |  |  |  |  |  |
| CLTE 23-85° C. Parallel average | μm/mK | 59 | 45 | 95 |  | 56 |
| Shrinkage 3-D (Riser plaque) |  |  |  |  |  |  |
| Total after 24 hrs/1 hr 90° | % | 0.83 | 0.78 | 1.06 | 0.92 | 0.81 |
| Scratch PSA/Renault D44 1900 EN1-RNPO 2001 |  |  |  |  |  |  |
| dL Perpendicular - 1 hr | — | 1.15 | 0.81 |  |  | 0.91 |
| dL Parallel - 1 hr | — | 0.32 | 0.37 |  |  | 0.42 |
| dL Perpendicular - 3 d | — | 1.04 | 0.80 |  |  | 0.89 |
| dL Parallel - 3 d | — | 0.29 | 0.29 |  |  | 0.38 |
| Greyscale 1 hr L&// | — | 3 (2-3) | 3 (2-3) |  |  | 3 (2-3) |
| Greyscale 3 d L&// | — | 3 (2-3) | 3 (2-3) |  |  | 3 (2-3) |
| Scratch VW PV 3952 2002 10N |  |  |  |  |  |  |
| dL Measurement 5 times (field diameter: >7 mm) K59 | — | 2.6 | 0.9 | 1.2 | 1.7 | 3 |
| Scratch Ford BN108-13 2001 |  |  |  |  |  |  |
| Scratch visibility 2N |  | visible | not visible | not visible | not visible | visible |
| Scratch visibility 3N | % | >60 | <30 | <30 | <30 | >80 |

The invention claimed is:

1. A moulded article made from a polypropylene composition comprising
   (A) 48-94.9 mass % of a polypropylene homopolymer;
   (B) 5-30 mass % of glass fibres having average length of 1-50 mm;
   (C) 0.1-2 mass % of oleamide and/or erucamide;
   (D) (0-20 mass % of other additives,
the article showing a colour change of dL<2 in the PSA/Renault D44 1900 EN1-RNPO 2001 scratch test and a colour change of dL<1.5 in the Volkswagen PV 3952 2002 scratch test.

2. The article according to claim 1, wherein the colour change in the PSA/Renault scratch test is dL<0.85.

3. The article according to claim 1, wherein the colour change in the Volkswagen scratch test is dL<1.1.

4. The article according to claim 1, further showing a non-visible scratch at a force of 2N and a non-visible scratch for more than 30% of the scratch length at a force of 3N in the Ford BN108-13 2001 scratch test.

5. The article according to claim 1, wherein the polypropylene in the polypropylene composition is a propylene impact copolymer.

6. The article according to claim 5, wherein the impact copolymer in the polypropylene composition contains 10-35 mass % based on the weight of the impact copolymer of a dispersed copolymer of ethylene and at least one other olefin.

7. The article according to claim 6, wherein the dispersed copolymer in the polypropylene composition is an ethylene-propylene copolymer having an ethylene content of 50-75 mass % based on the weight of the ethylene propylene copolymer.

8. The article according to claim 1, wherein the polypropylene composition contains glass fibres of average length 4-15 mm.

9. The article according to claim 1, wherein the polypropylene composition contains 5-20 mass % of glass fibres.

10. The article according to claim 1, wherein the polypropylene composition contains 0.1-0.5 mass % of oleamide and/or erucamide.

11. The article according to claim 1, wherein said article is a (semi-) finished article that is made by an injection moulding process.

12. The article according to claim 11, wherein the average length of glass fibres is between 1 and 5 mm.

13. An automotive part made from a polypropylene composition comprising
   (A) 48-94.9 mass % of a polypropylene homopolymer;
   (B) 5-30 mass % of glass fibres having average length of 1-50 mm;
   (C) 0.1-2 mass % of oleamide and/or erucamide;
   (D) 0-20 mass % of other additives,
the article showing a colour change of dL<2 in the PSA/Renault D44 1900 EN1-RNPO 2001 scratch test and a colour change of dL<1.5 in the Volkswagen PV 3952 2002 scratch test.

14. The article according to claim 1, wherein the polypropylene is a crystallizable polypropylene.

* * * * *